United States Patent [19]
Skarbo et al.

[11] Patent Number: 5,546,447
[45] Date of Patent: Aug. 13, 1996

[54] DISPLAYING CALLER IDENTIFICATION INFORMATION IN A COMPUTER SYSTEM

[75] Inventors: Rune A. Skarbo, Hillsboro; John D. Elliott, Aloha, both of Oreg.

[73] Assignee: Intel Corporation, Santa Clara, Calif.

[21] Appl. No.: 268,265

[22] Filed: Jun. 29, 1994

[51] Int. Cl.⁶ .......................... H04M 15/06; H04M 1/56
[52] U.S. Cl. ............................................. 379/142; 379/96
[58] Field of Search ............................... 379/93, 96, 127, 379/142, 201

[56] References Cited

U.S. PATENT DOCUMENTS

| | | | |
|---|---|---|---|
| 4,924,496 | 5/1990 | Figa | 379/142 |
| 5,054,055 | 10/1991 | Hanle | 379/142 |
| 5,220,599 | 6/1993 | Sasane | 379/142 |
| 5,265,145 | 11/1993 | Lim | 379/142 |
| 5,267,307 | 11/1993 | Izumi | 379/201 |
| 5,278,894 | 1/1994 | Shaw | 379/142 |
| 5,283,818 | 2/1994 | Klausner | 379/96 |
| 5,343,516 | 8/1994 | Callele | 379/93 |
| 5,349,638 | 9/1994 | Pitrode | 379/93 |
| 5,422,938 | 6/1995 | Yamanishi | 379/142 |

*Primary Examiner*—Stephen Chin
*Assistant Examiner*—Paul Loomis
*Attorney, Agent, or Firm*—Blakely, Sokoloff Taylor & Zafman

[57] ABSTRACT

An apparatus and method for displaying caller identification information in a computer system. The present invention is a caller identification system for displaying caller information, the system comprises: 1) a telephone interface for receiving an incoming call from a caller, the telephone interface further receiving information indicating a caller telephone number corresponding to the caller, 2) logic for searching a caller information database for caller information corresponding to the caller telephone number, the caller information including at least the caller telephone number and a caller name, 3) logic for retrieving the caller information, and 4) logic for automatically displaying the caller information without user intervention. The caller identification system of the present invention includes logic for automatically displaying the caller information in a business card format.

28 Claims, 7 Drawing Sheets

| Area Code | Caller Telephone Number | Name | Title | Employer | Address | Internet Name | Alternate Telephone Number | Business Logo | Caller Photo |
|---|---|---|---|---|---|---|---|---|---|
| 408 | 555-1212 | John Smith | Engineer | Acme, Corp. | 123 First St. Sunnyvale, CA | Smith. Acme.com | 555-1234 | LOGO.BMP | CALLER.PCT |
| | | | | | | | | | |
| | | | | | | | | | |
| | | | | | | | | | |

DISPLAYING CALLER IDENTIFICATION INFORMATION IN A COMPUTER SYSTEM

BACKGROUND OF THE INVENTION

1. Field of the Invention

The present invention relates to the field of computer systems which are coupled to a telephone network. Specifically, the present invention pertains to computer systems having a caller identification feature.

2. Description of Related Art

With the advent of modern telephone systems, the ability to display the telephone number of a calling party is now possible. Many prior art systems for capturing the telephone number of a calling party are already well known. Such systems include private branch exchange (PBX) systems or other call processing systems. These conventional systems, however are limited to displaying to a computer user only the telephone number of the calling party. It is convenient in many circumstances, such as in an electronic conferencing system, to display additional information about a calling party. Prior art systems are unable to display this additional information. Additionally, it is convenient to display caller information to a computer user immediately upon receipt of the telephone call. It is typically inconvenient to require the computer user to activate a special function for displaying caller information at the same time the computer user is directing attention to answering the incoming call. It would also be convenient to display this caller information in a format familiar to most people. These and other limitations of the prior art are addressed by the present invention.

Thus, a better means for displaying caller identification information for a computer user is needed.

SUMMARY OF THE INVENTION

The present invention is an apparatus and method for displaying caller identification information in a computer system. The present invention is a caller identification system for displaying caller information, the system comprises: 1) a telephone interface for receiving an incoming call from a caller, the telephone interface further receiving information indicating a caller telephone number corresponding to the caller, 2) logic for searching a caller information database for caller information corresponding to the caller telephone number, the caller information including at least the caller telephone number and a caller name, 3) logic for retrieving the caller information, and 4) logic for automatically displaying the caller information without user intervention. The caller identification system of the present invention includes logic for automatically displaying the caller information in a business card format.

It is an advantage of the present invention that caller information is automatically displayed to a computer user when a call is received by a computer system. It is a further advantage of the present invention that a the caller's name, address, and business information is automatically displayed. It is a further advantage of the present invention that the caller information is displayed to the computer user in a business card format.

These and other advantages of the present invention will become apparent as illustrated in the figures and described in the following Detailed Description of the Preferred Embodiment.

DETAILED DESCRIPTION OF THE PREFERRED EMBODIMENT

The present invention is an apparatus and method for displaying caller identification information in a computer system. In the following detailed description, numerous specific details are set forth in order to provide a thorough understanding of the present invention. However, it will be apparent to one of ordinary skill in the art that these specific details need not be used to practice the present invention. In other circumstances, well known structures, materials, circuits, and interfaces have not been shown or described in detail in order not to unnecessarily obscure the present invention.

Figure 1:
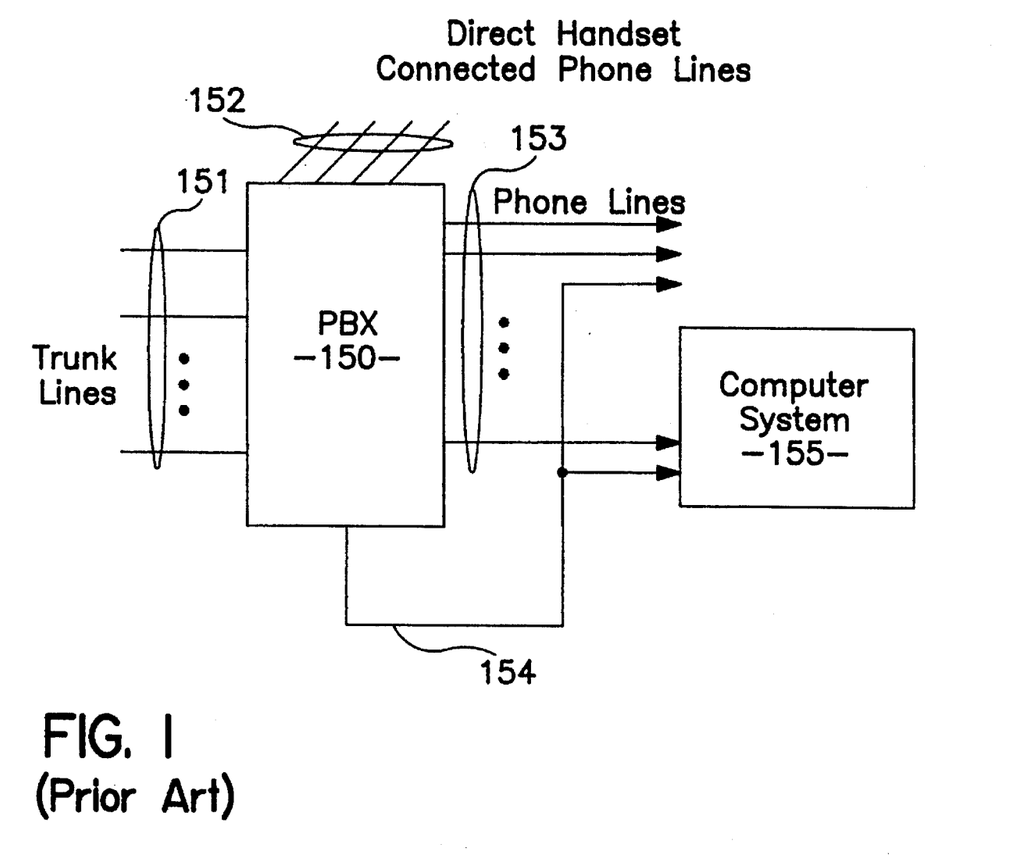
FIG. 1 illustrates a prior art telephone PBX system coupled to a typical computer system in which the present invention operates.
Figure 2:
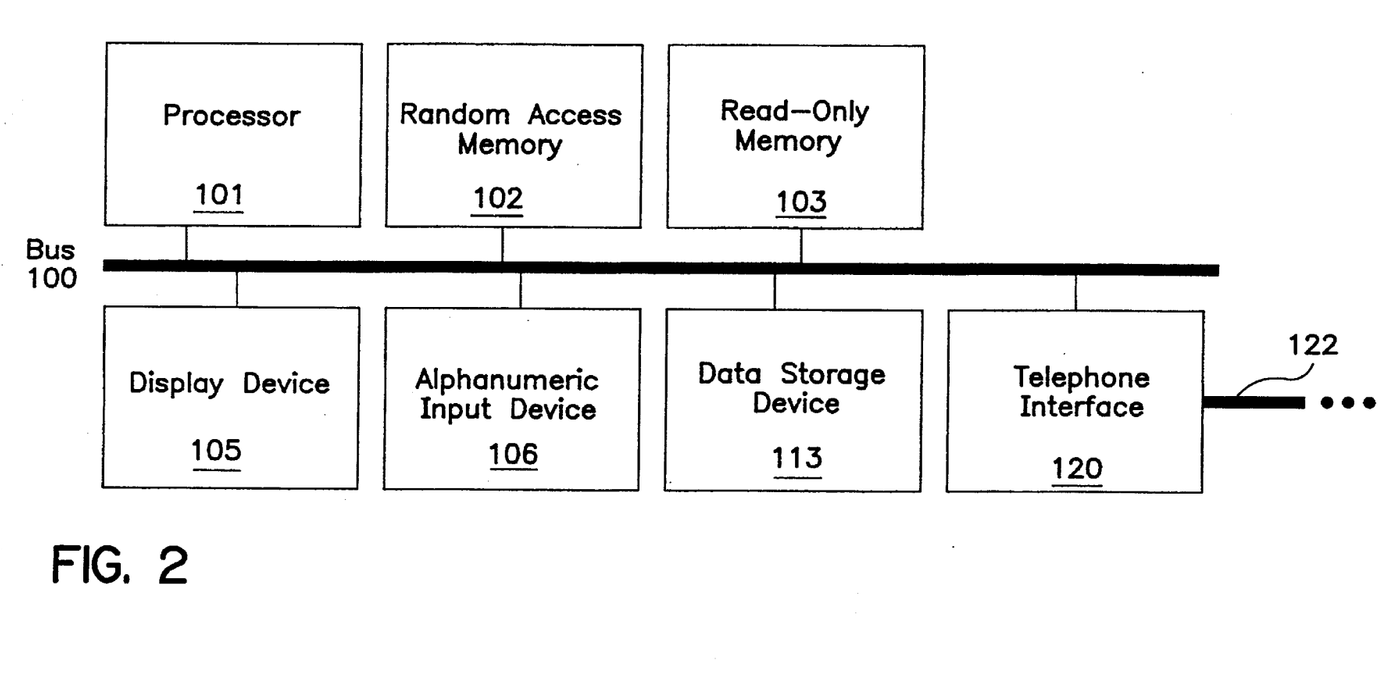
FIG. 2 illustrates a typical computer system architecture in which the present invention operates.

Referring to FIG. 1, a prior art telephone private branch exchange (PBX) system is illustrated. As shown, trunk lines 151 connect with PBX 150. Individual telephone lines 152 are provided for direct connection of telephone handsets. Individual telephone lines 153 connect PBX 150 with a call processing system (not shown) or one or more computer systems such as computer system 155. One such computer system is illustrated in FIG. 2 and described below. Control line 154 connects PBX 150 to computer system 155. Control line 154 provides computer system 155 with usable information regarding the source of the call. Specifically, control line 154 provides the caller telephone number to computer system 155. The system illustrated in FIG. 1 is well known to those of ordinary skill in the art. It is also apparent to those of ordinary skill in the art that other means are well known for providing the caller telephone number to a computer system such as computer system 155.

Referring now to FIG. 2, a typical computer system architecture in which the present invention operates is illustrated. The preferred embodiment of the present invention is implemented on an IBM™ PC brand computer manufactured by IBM Corporation of Armonk, N.Y. IBM is a trademark of IBM Corporation. It will be apparent to those of ordinary skill in the art, however that alternative computer systems may be employed. In general, such computer systems, as illustrated in FIG. 2, comprise a bus 100 for communicating information, a processor 101 coupled with the bus 100 for processing information, a random access memory 102 coupled with the bus 100 for storing information and instructions for the processor 101, a read only memory 103 coupled with 100 for storing static information and instructions for the processor 101, a display device 105 coupled with the bus 100 for displaying information for a computer user, an alphanumeric input device 106 coupled with bus 100 for communicating information and command selections to the processor 101, and a data storage device 113 such as a magnetic disk and disk drive coupled with the bus 100 for storing information and instructions.

Processor 101 may be any of a wide variety of general purpose processors or microprocessors such as the i486™ or Pentium brand microprocessors manufactured by Intel Corporation of Santa Clara, Calif. The Intel, i486, and Pentium marks are trademarks of Intel Corporation. It will be apparent to those of ordinary skill in the art, however, that other varieties of processors may be used in a particular computer system. Display device 105 may be a liquid crystal device, cathode ray tube (CRT), or other suitable display device. Data storage device 113 may be a conventional hard disk drive, floppy disk drive, or other magnetic or optical data storage medium. In general, processor 101 retrieves processing instructions and data from data storage device 113 and downloads this information into random access memory 102 for execution. Processor 101 then executes an instruction stream from random access memory 102 or read only memory 103. Command selections and information input at alphanumeric input device 106 are used to direct the flow of instructions executed by processor 101. The results of this processing execution are then displayed on display device 105.

The computer system of the preferred embodiment also includes a telephone interface 120 for connecting the computer system to a telephone network on line 122. Line 122 is coupled to one of the telephone lines 153 and control line 154 as shown in FIG. 1. In this manner, computer system 155 receives a telephone call and caller identification information in the form of a telephone number corresponding to the caller. The means for receiving a caller telephone number is well known to those of ordinary skill in the art.

The preferred embodiment of the present invention is a software based caller identification system that automatically generates caller identification information in a business card format on display device 105. The processing logic of the present invention is typically operatably disposed within random access memory 102 and executed by processor 101 of the computer system described above. The processing logic of the present invention may equivalently be disposed in read only memory 103 or other memory means accessible to processor 101 for execution. This processing logic can be a separately compiled and loaded entity or incorporated as part of a larger software applications system. In either case, a means for activating the processing logic of the present invention may be performed using techniques well known to those of ordinary skill in the art. Once activated, the processing logic of the present invention operates in the manner illustrated starting in FIG. 3 and described below.

Figure 3:
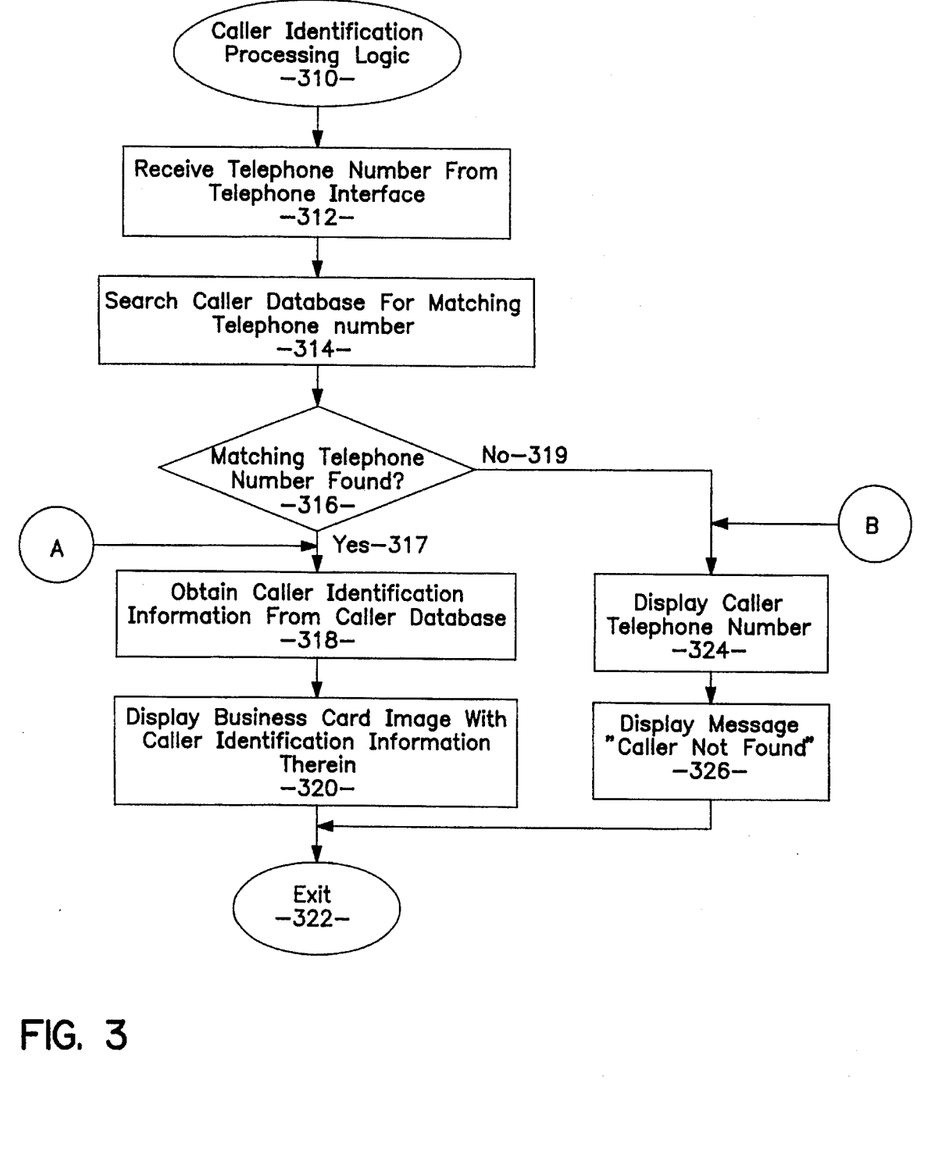
FIG. 3 is a flowchart illustrating the processing logic of the preferred embodiment.

Referring now to FIG. 3, the initial portion of the processing logic of the present invention is illustrated. Upon activation by user input or the operation of an operating system process, the processing logic of the present invention is initiated at the bubble labeled "Caller Identification Processing Logic" 310. In an initial processing step, the caller telephone number is received from telephone interface 120 (processing block 312). The received caller telephone number is used as a search string for searching a caller database for a matching caller identification information record. The caller identification information database is used for the storage of caller identification information corresponding to a particular caller telephone number. A sample caller identification information database is illustrated in FIG. 4.

Figure 4:
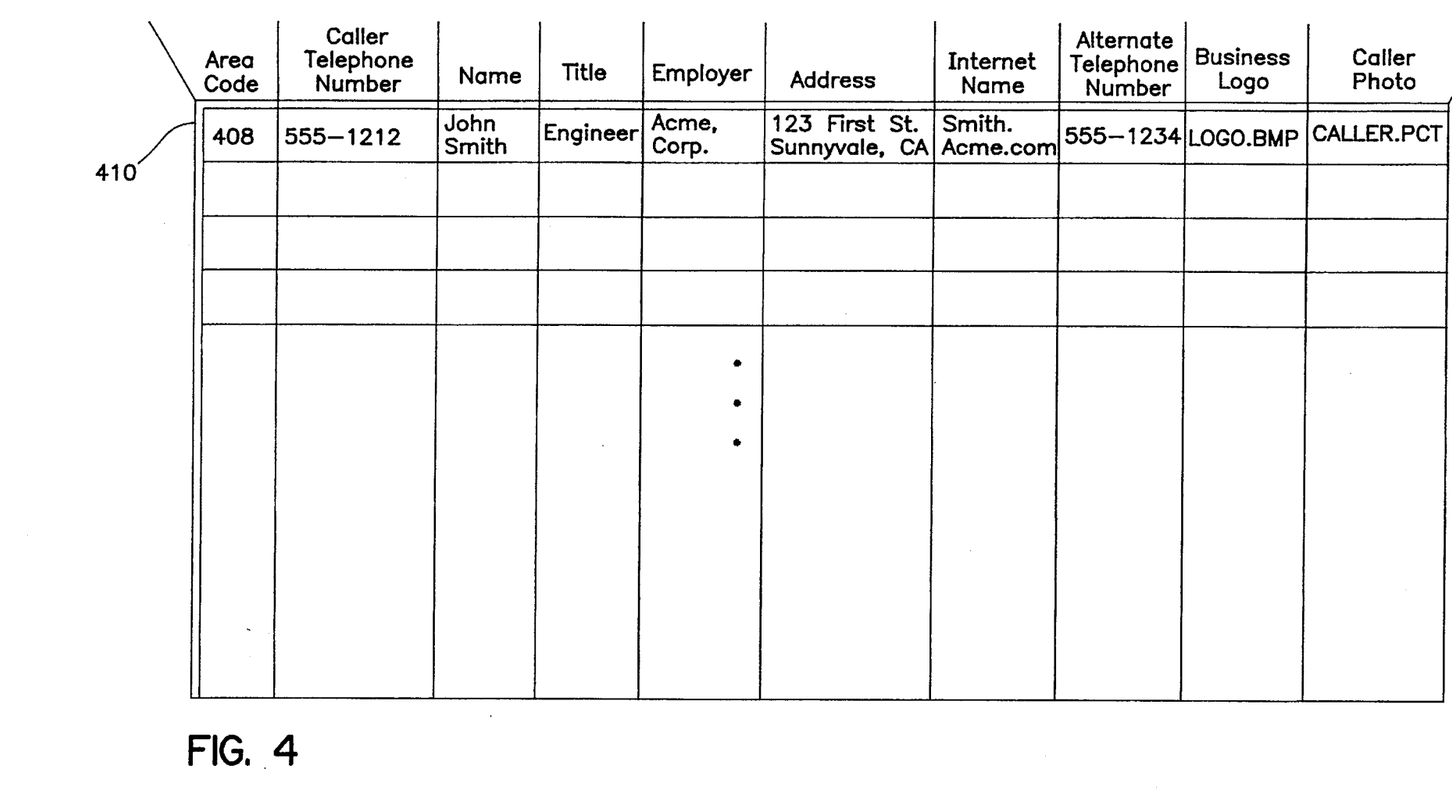
FIG. 4 is a sample diagram of a caller database for maintaining caller identification information.

Referring now to FIG. 4, a sample caller identification information database is illustrated. The caller database of the preferred embodiment comprises a record of information for each caller. An example of one such record 410 is illustrated in FIG. 4. In the preferred embodiment, the caller identification information record 410 comprises an area code and telephone number of a particular caller. The name of the caller is identified in the next field of record 410. In addition, other information pertaining to the caller such as the title or employment position of the caller, the employer of the caller, the address of the caller, the Internet name of the caller, and an alternate telephone number for the caller is retained in record 410. In addition, the file identifier of a business card logo bit map or image file may also be retained in record 410. Similarly, a file identifier of an image file corresponding to a picture of the caller is also retained in record 410. It will be apparent to one of ordinary skill in the art that many other items of caller identification information may similarly be retained in record 410. A distinct record for each caller telephone number is retained in the caller identification database. Each record contains caller identification information pertaining to the caller telephone number. It will also be apparent to one of ordinary skill in the art that the caller identification information database may also be part of a larger independent caller information management system accessed through standard function calls.

Some issues complicate the structure and querying of the caller information database. For example, the caller telephone number received in processing block 312 may be a ten-digit number (area code plus seven-digit station number), even for local calls. This is often the case in many conventional telephone systems. In other cases, the caller telephone number received in processing block 312 may actually be a pair of telephone numbers. Many ISDN systems require two different numbers to be dialed in order to use both B channels (double directory numbers) as opposed to a single number (single directory number). Thus, a telephone number pair may be presented by these systems. The order in which these numbers are presented by the telephone interface is usually unknown and may be telephone switch dependent. As a further complication, telephone number format and handling may be different in foreign countries.

Figure 6:
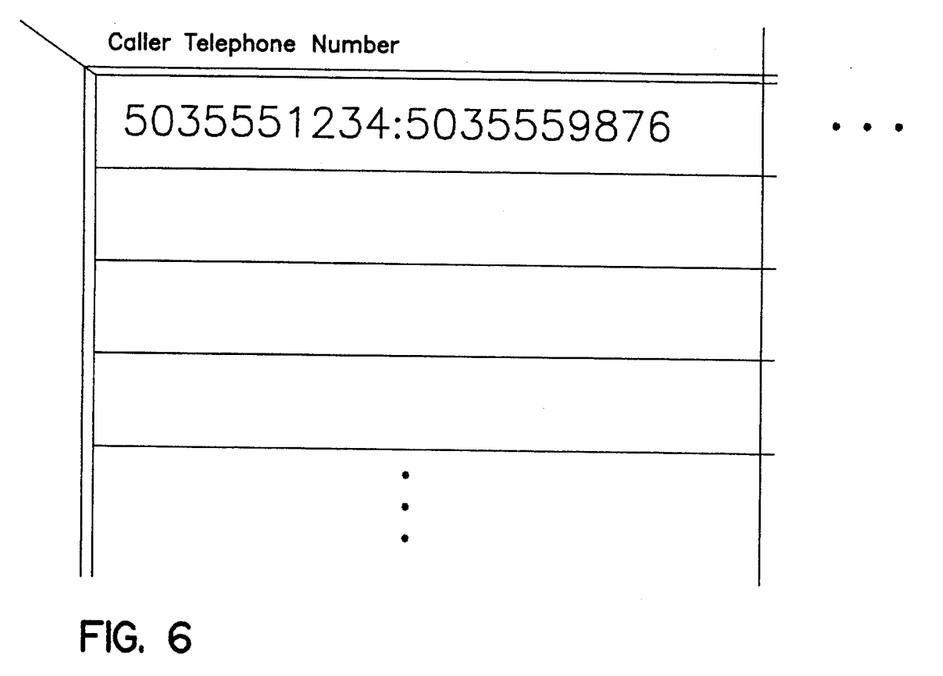
FIG. 6 is a sample diagram of a caller database having a field for maintaining a telephone number pair.

The caller information in the caller identification information database can be augmented to support these more complicated systems. An example of an augmented caller telephone number field 610 in the caller identification information database is illustrated in FIG. 6. In this example, the caller telephone number field is expanded to hold a pair of telephone numbers separated by a colon. The processing logic of the present invention can determine if an incoming telephone number is a number pair by searching for a colon in the number string. The presence of the colon indicates the occurrence of the number pair. It will be apparent to one of ordinary skill in the art that other schemes can be used to determine if an incoming telephone number is a single number or a number pair. It will also be apparent to one of ordinary skill in the art that the caller telephone number can be alternatively stored in the caller identification information database as a single seven-digit telephone number with a separate area code, a single ten-digit telephone number, two separate telephone numbers in two database fields, or as one telephone number pair in a single database field.

Referring again to FIG. 3, the caller identification information database is searched in processing block 314. The caller telephone number received in processing block 312 is used to search the caller telephone number field for each record in the caller identification information database in processing block 314. If a matching telephone number is found, processing path 317 is taken to processing block 318 where the caller identification information is obtained from the record which contained the matching caller telephone number in the caller identification information database. The caller identification information thus obtained corresponds to the information illustrated by example in FIG. 4.

Figure 7:
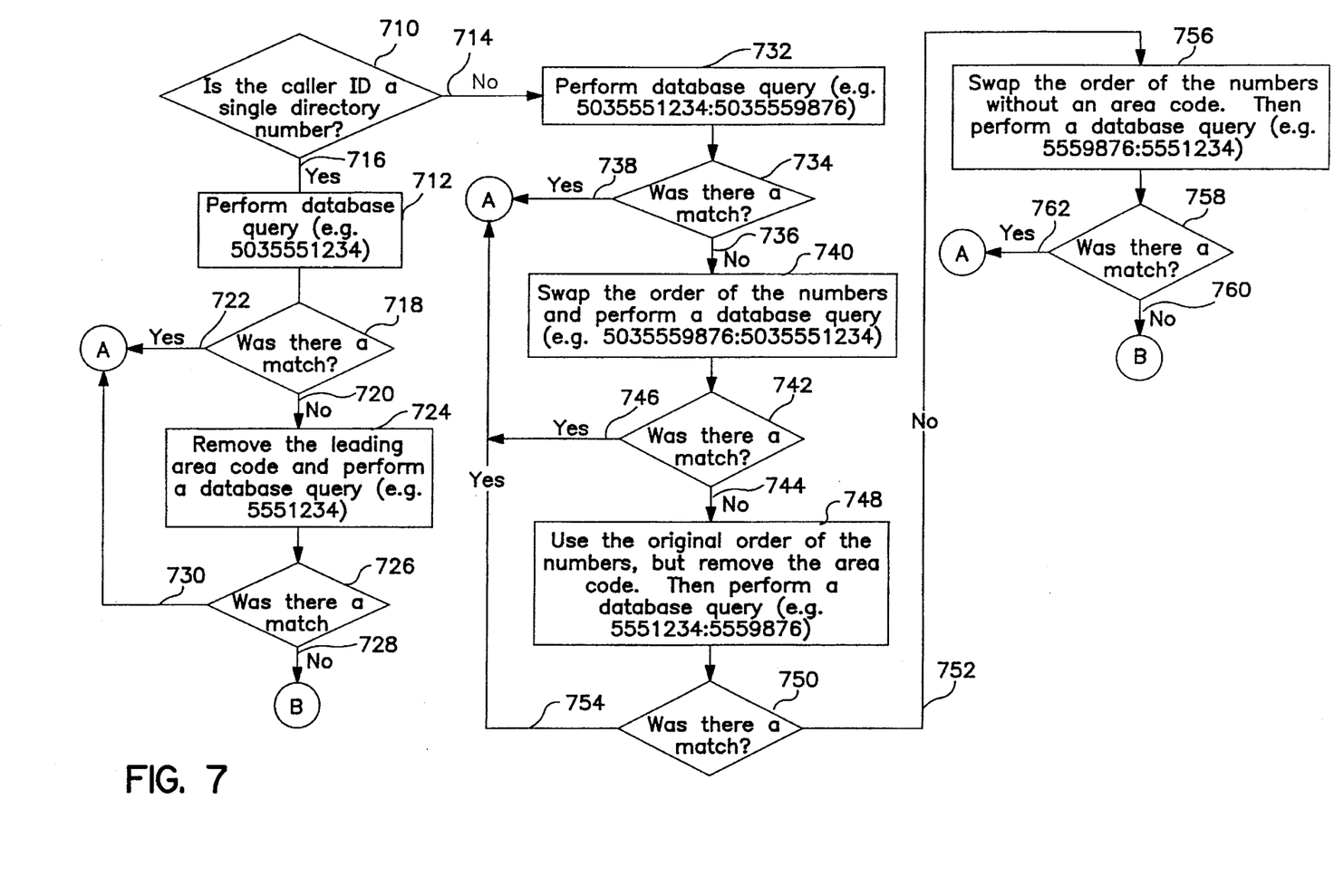
FIG. 7 is a flowchart illustrating the processing logic for searching the caller identification information database.

In the case of the more complicated systems described above, FIG. 7 illustrates an example of a more complicated search of the caller identification information database as performed within processing block 314. Referring to FIG. 7 in decision block 710, the received telephone number string (i.e. the caller ID) is tested for the occurrence of a telephone number pair as discussed above. If the caller ID is a single directory number (processing path 716), a database query is first attempted with the ten digit telephone number received from the telephone interface (processing block 712). If a matching record is found in the caller identification information database, processing path 722 is taken to the bubble labeled A illustrated in FIG. 3 where the caller information is displayed. If the received caller telephone number is not found in the caller identification information database as a ten-digit telephone number, the database query is attempted again after stripping the area code from the received telephone number thereby leaving a seven-digit telephone number (processing block 724). If a matching record is found in the caller identification information database for the seven-digit telephone number, processing path 730 is taken to the bubble labeled A illustrated in FIG. 3 where the caller information is displayed. Otherwise, the received telephone number cannot be found in the caller database. In this case, processing path 728 is taken to the bubble labeled B illustrated in FIG. 3 where the user is notified that the caller information could not be found.

Referring back to decision block 710 shown in FIG. 7, processing path 714 is taken if the caller ID is not a single directory number. In this case, a caller ID in the form of a telephone number pair as illustrated in FIG. 6 has been received from the telephone interface. A database query is first attempted with the received telephone number pair using the ten-digit format for both individual telephone numbers of the pair in the order received from the telephone interface (processing block 732). If a matching record is found in the caller identification information database, processing path 738 is taken to the bubble labeled A illustrated in FIG. 3 where the caller information is displayed. If the received telephone number pair in dual ten-digit form is not found in the caller identification information database, the database query is attempted again after swapping the position of each of the individual ten-digit numbers of the telephone number pair (processing block 740). If a matching record is found in the caller identification information database, processing path 746 is taken to the bubble labeled A illustrated in FIG. 3 where the caller information is displayed. If the swapped telephone number pair in dual ten-digit form is not found in the caller identification information database, the database query is attempted again after restoring the individual telephone numbers of the pair to their original ordering and stripping the area codes from each individual number thereby producing dual seven-digit individual telephone numbers in their original order (processing block 748). If a matching record is found in the caller identification information database, processing path 754 is taken to the bubble labeled A illustrated in FIG. 3 where the caller information is displayed. If the received telephone number pair in dual seven-digit form is not found in the caller identification information database, the database query is attempted again after swapping the position of each of the individual seven-digit numbers of the telephone number pair (processing block 756). If a matching record is found in the caller identification information database, processing path 762 is taken to the bubble labeled A illustrated in FIG. 3 where the caller information is displayed. Otherwise, the received telephone number pair cannot be found in the caller database. In this case, processing path 760 is taken to the bubble labeled B illustrated in FIG. 3 where the user is notified that the caller information could not be found.

Figure 5:
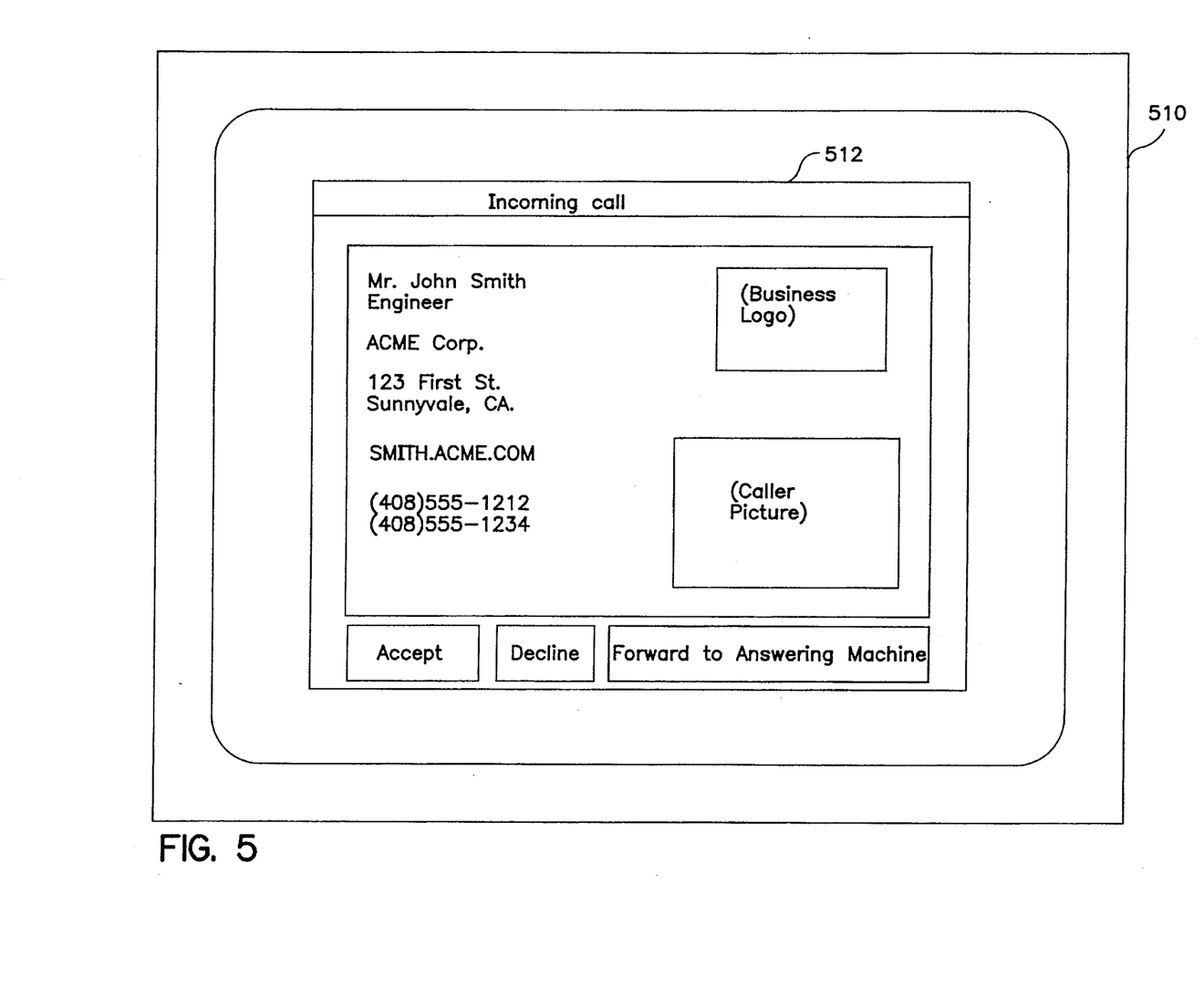
FIG. 5 illustrates the business card format for displaying caller identification information to a computer user.

Referring again to FIG. 3 in processing block 320, the caller identification information obtained from the database is displayed in a business card image in a pop-up window on a display screen such as display 510 as illustrated in FIG. 5. The business card image 512 illustrated in FIG. 5 contains the formatted content of the caller identification information retrieved from the caller database. The image of the business logo and caller picture is obtained using the file identifier retrieved from the caller identification information database.

The business card image 512 further includes three soft buttons: Accept, Decline, and Forward to Answering Machine in the preferred embodiment. Means for displaying and receiving activations of soft buttons are well known in the art. These soft buttons allow the user to specify the desired method for handling the incoming telephone call. If the Accept soft button is activated using a mouse or other conventional input device, the incoming call is answered in a conventional manner. If the Decline soft button is activated, the call is not answered and the business card image 512 is removed from the display 510. If the Forward to Answering Machine soft button is activated, the call is routed to an answering machine interface using techniques well known in the art. In this manner, the caller identification information is automatically displayed in a business card format for a computer user. Processing for the caller identification processing logic then terminates at the exit bubble 322 illustrated in FIG. 3.

If a matching telephone number is not found in the caller identification database, processing path 319 is taken to processing block 324 where the caller telephone number only is displayed for the computer user. A message is displayed to the computer user notifying the user that the caller identification information was not found in the caller identification information database (processing block 326). Processing for the caller identification processing logic then terminates through the exit bubble 322 illustrated in FIG. 3.

Thus, an apparatus and method for displaying caller identification information in a computer system is disclosed. Although the present invention is described herein with reference to a specific preferred embodiment, many modifications and variations therein will readily occur to those of ordinary skill in the art. Accordingly, all such variations and modifications are included within the intended scope of the present invention as defined by the following claims.

We claim:

1. In a computer system, a caller identification system for displaying caller information comprising:

a telephone interface for receiving an incoming call from a caller, said telephone interface further receiving information indicating a caller telephone number corresponding to said caller;

means for searching a caller information database for caller information corresponding to said caller telephone number, said caller information including at least said caller telephone number and a caller name;

means for retrieving said caller information;

means for automatically displaying said caller information without user intervention before the incoming call is accepted, declined, or forwarded; and means for directing said incoming call to allow said call to be accepted, declined, or forwarded by a user independently of a telephone hand set.

2. The caller identification system as claimed in claim 1 wherein said means for searching further includes means for requesting an independent database to search for said caller information corresponding to said caller telephone number.

3. The caller identification system as claimed in claim 1 wherein said caller information further includes a caller address.

4. The caller identification system as claimed in claim 1 wherein said caller information further includes a caller area code.

5. The caller identification system as claimed in claim 1 wherein said caller information further includes a caller business logo.

6. The caller identification system as claimed in claim 1 wherein said caller information further includes a caller picture.

7. The caller identification system as claimed in claim 1 wherein said means for automatically displaying said caller information further includes logic for automatically displaying said caller information in a business card format.

8. In a computer system, a caller identification system for displaying caller information, said computer system comprising:

means for receiving an incoming call from a caller, said means for receiving further including means for receiving information indicating a caller telephone number corresponding to said caller;

means or searching a caller information database for caller information corresponding to said caller telephone number, said caller information including at least said caller telephone number and a caller name;

means for retrieving said caller information;

means for automatically displaying said caller information without user intervention before the incoming call is accepted, declined, or forwarded;

means for directing said incoming call to allow said call to be accepted, declined, or forwarded by a user independently of a telephone hand set.

9. The caller identification system as claimed in claim 8 wherein said means for searching further includes means for requesting an independent database to search for said caller information corresponding to said caller telephone number.

10. The caller identification system as claimed in claim 8 wherein said caller information further includes a caller address.

11. The caller identification system as claimed in claim 8 wherein said caller information further includes a caller area code.

12. The caller identification system as claimed in claim 8 wherein said caller information further includes a caller business logo.

13. The caller identification system as claimed in claim 8 wherein said caller information further includes a caller picture.

14. The caller identification system as claimed in claim 8 wherein said means for automatically displaying said caller information further includes logic for automatically displaying said caller information in a business card format.

15. In a computer system, a process for displaying caller information, said process comprising the steps of:

receiving an incoming call from a caller, said step of receiving further including a step of receiving information indicating a caller telephone number corresponding to said caller;

searching a caller information database for caller information corresponding to said caller telephone number, said caller information including at least said caller telephone number and a caller name;

retrieving said caller information;

automatically displaying said caller information without user intervention;

directing said incoming call to be accepted, declined, or forwarded by a user independently of a telephone handset.

16. The process as claimed in claim 15 wherein said step of searching further includes a step of requesting an independent database to search for said caller information corresponding to said caller telephone number.

17. The process as claimed in claim 15 wherein said caller information further includes a caller address.

18. The process as claimed in claim 15 wherein said caller information further includes a caller business logo.

19. The process as claimed in claim 15 wherein said caller information further includes a caller picture.

20. The process as claimed in claim 15 wherein said caller information further includes a telephone number pair.

21. The process as claimed in claim 15 wherein said caller telephone number includes a telephone number pair and said step of searching further includes the step of swapping individual telephone numbers of said telephone number pair.

22. The process as claimed in claim 15 wherein said step of automatically displaying said caller information further includes a step of automatically displaying said caller information in a business card format.

23. The caller identification system of claim 1 wherein said means for directing is responsive to soft buttons displayed on said means for automatically displaying.

24. The caller identification system of claim 23 wherein said soft buttons include an accept button, a decline button and a forward to voice mail button.

25. In a computer system, a method of displaying caller information, the method comprising the steps of:

receiving an incoming call from a caller, including receiving information indicating a caller telephone number corresponding to said caller;

searching a caller information database for caller information corresponding to the caller telephone number including at least the caller telephone number and a caller name;

retrieving the caller information if the caller information is found;

stripping a portion of the caller telephone number to yield a stripped number having fewer digits, if no caller information corresponding to the caller telephone number;

researching the caller information database using the stripped number for caller information corresponding to the stripped number, including at least the stripped number and a caller name;

automatically displaying said caller information without user intervention.

26. In a computer system, a method of displaying caller information, the method comprising the steps of:

receiving an incoming call including information indicating a caller telephone number;

selectively stripping off a portion of the caller telephone number to yield a stripped telephone number;

the stripping performed responsive to a predetermined condition;

searching a caller information database for caller information corresponding to the stripped telephone number;

retrieving the caller information; and automatically displaying said caller information without user intervention.

27. The method of claim 21 wherein the portion stripped is the area code.

28. The method of claim 26 wherein the predetermined condition is no caller information found in the caller information database corresponding to the caller telephone number.

* * * * *